UNITED STATES PATENT OFFICE.

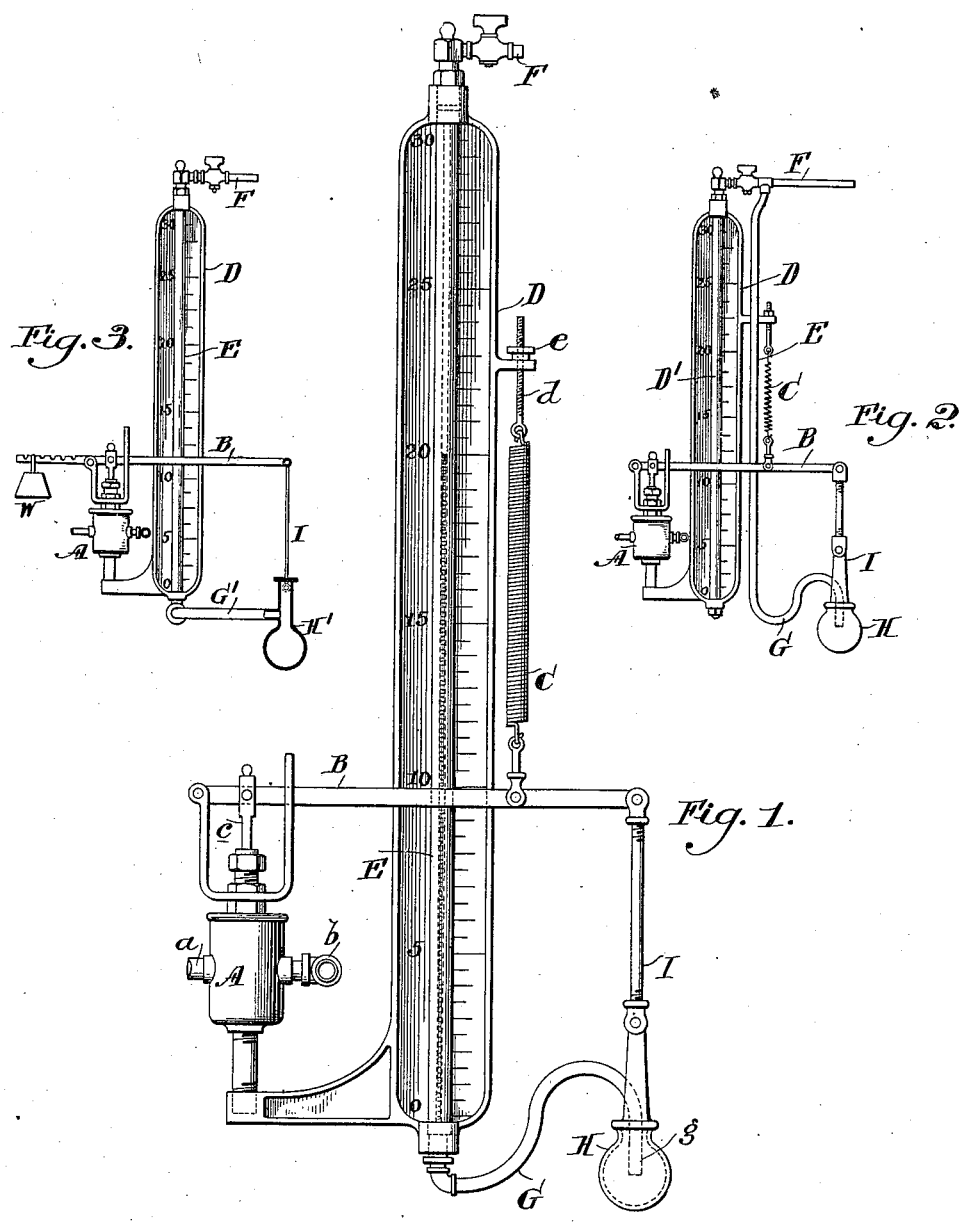

MEREDITH LEITCH, OF RICHMOND, VIRGINIA, ASSIGNOR TO THE WARREN WEBSTER & COMPANY, OF NEW JERSEY.

REGULATOR FOR SUCTION CREATING OR EXHAUSTING DEVICES.

SPECIFICATION forming part of Letters Patent No. 577,263, dated February 16, 1897.

Application filed September 15, 1896. Serial No. 605,878. (No model.)

*To all whom it may concern:*

Be it known that I, MEREDITH LEITCH, of Richmond, Henrico county, State of Virginia, have invented an Improvement in Regulators for Suction Creating or Exhausting Devices, of which the following is a specification.

My invention relates to regulators for suction creating or exhausting devices and is fully set forth in the following specification and illustrated in the accompanying drawings.

It is the object of my invention to enable the operation of an exhausting or vacuum-creating device to be regulated by the partial vacuum which it creates, so that a substantially uniform partial vacuum may be automatically maintained without regard to variations in the condition of operation of the apparatus with which the vacuum-creating device or exhauster is connected.

My invention is especially adapted for use in connection with vacuum-pumps or exhausting devices used in connection with condensers, evaporators, and those steam-heating systems in which circulation is induced by means of a partial vacuum created in the returns. In such steam-heating systems it is desirable that a uniform vacuum should be maintained while the system is in operation; but as changes occur in the conditions of working, as when part of the radiators are shut off or when variations occur in the generation or supply of steam, a uniform operation of the vacuum-creating device will not maintain a uniform vacuum under such changed conditions. By my invention, however, when such changes occur the variation thus produced in the partial vacuum will automatically regulate the operation of the exhaust or vacuum creating devices, so as to restore the normal partial vacuum. Thus during the operation of the apparatus a uniform vacuum may be maintained and the operation of the vacuum-pump will be automatically regulated to vary with variations in the condition in which the system is operating.

In carrying out my invention I employ a regulator controlling the operation of the pump or exhausting device and itself controlled by the partial vacuum which the pump or exhausting device creates.

In the preferred embodiment of my invention I employ a movable counterbalancing-reservoir, communicating with a suction-tube from the pump, containing mercury and connected with the regulator, so that as the variation in the suction created in the tube communicating with the counterbalancing-reservoir increases or decreases the quantity of mercury in the reservoir, and thus changes its weight, it will control the operation of the regulator to vary the action of the pump or exhausting devices.

I shall now refer to the accompanying drawings, which illustrate my invention.

Figure 1 is a front elevation of my regulator or governor, showing the same combined with an ordinary mercury-column vacuum-gage. Fig. 2 is a similar view on a reduced scale, showing the governor separate from the vacuum-gage; and Fig. 3 is a similar view illustrating a modification of the invention.

A is the regulator for controlling the operation of the vacuum creating or exhausting device. The regulator A is shown as a valve through which steam is supplied to the pump, having the usual connections $a$ with the steam-main and $b$ with the pump. An ordinary balance steam-valve may be used.

B is a lever connected with the valve-stem $c$ for operating the valve or regulator to control the passage of steam in the usual manner.

C is a spring acting on the lever B to operate the valve which it controls. I have shown the spring connected at one end with the lever B and at the other end with a frame D through a screw $d$ and nut $e$, by means of which the tension of the spring C may be regulated.

Instead of a spring C an ordinary counter-balance-weight W may be used, and I have shown this construction in the modification illustrated in Fig. 3.

The lever B and spring C or counterbalance W constitute a tension device acting on the regulator A to operate it.

E is a tube adapted to contain a column of mercury or other suitable substance communicating at its upper end with the suction-pipe F of the pump or exhausting device.

G is a tube-section communicating at one end with the bottom of the tube E and at the other end with a bulb or reservoir H. In the construction shown in Figs. 1 and 2 the tube-section G is shown with a bent end $g$ dipping loosely into the bulb or reservoir H, which is carried by an arm I, suspended from the lever B.

So far as the apparatus has been described its operation is as follows: The bulb or reservoir H being filled with mercury will by its weight act on the lever B to depress it against the action of the spring C or weight. The tension of the spring C is so adjusted that the two forces will counterbalance one another, with the valve A opened to admit steam to the pump. As the pump operates to create a suction in the tube E it will draw the mercury from the reservoir H into the tube, thus diminishing the weight of the bulb H and permitting the spring C or counterpoise to act on the lever and operate the valve A, so as to control the supply of the steam to the pump. If the suction in the tube E decreases, the mercury will flow back into the bulb H, increasing its weight and drawing down the lever B. In this way the variation of the suction in the tube E will increase or decrease the quantity of the mercury in the bulb H, and by varying the weight will operate the lever B and valve A, so that the supply of steam to the pump will be regulated. When the suction decreases and the lever B falls, the valve A is opened to increase the steam-supply to the pump, so that it will run faster and increase the suction, and when the suction increases and the lever B rises the valve A is closed to decrease the steam-supply and reduce the speed of the pump.

By properly regulating the tension of the spring C or equipoise to counterbalance the weight of the bulb H when it contains a certain quantity of mercury the normal position of the lever B and valve A may be regulated to suit a certain maintained partial vacuum, so that any variation in the partial vacuum due to any change in the conditions of working will instantly produce a change in the valve A and consequently in the operation of the pump, so that the desired partial vacuum will be restored.

The reservoir H constitutes a variable counterweight acting against the tension devices for operating the regulator A.

In the construction shown in Fig. 1 the tube E is made the ordinary vacuum-gage, thus combining the vacuum-gage and pump-regulator in a single apparatus, while in the construction shown in Fig. 2 the vacuum-gage D' is independent of the tube E and bulb H.

In the modification shown in Fig. 3, instead of the tube-section G and a separate bulb H, suspended from the lever B, I have shown a tube-section G' jointed, as at $g'$, to the end of the tube E and carrying the bulb H' on its end, the latter being open to the atmosphere. This jointed section G' is connected with the lever B by the connection I, as in the former case, and instead of the spring C a counterpoise-weight W is shown suspended on the lever B.

Instead of mercury other suitable material may be employed.

I do not mean to limit my invention to the operation of a valve A to control the steam-supply to a vacuum-pump, as it is apparent that the invention may be employed as a regulator for any device controlling the operation of suction creating or exhausting devices—such, e. g., as a current-controller for operating an electrically-driven pump or exhauster.

The valve A is a regulating device for controlling the operation of the suction-creating devices, and other well-known regulating devices may be substituted for it.

The details of construction may be varied without departing from the invention.

What I claim as new, and desire to secure by Letters Patent, is—

1. The combination with an exhausting or vacuum-creating device, of a regulator for controlling the operation thereof, a counterweight, embracing a reservoir containing a liquid, such as mercury, which varies with the partial vacuum created by the exhausting or vacuum-creating device, means acting on the regulator to operate it as the counterweight varies, and connections between the variable counterweight and the means acting on the regulator, whereby the variation of the counterweight by the suction created in the reservoir will cause the regulator to be operated.

2. The combination with a tube in which a suction is created, of a movable reservoir adapted to contain a fluid, such as mercury, communicating therewith, and a regulator controlled by the movement of the movable reservoir.

3. The combination of a tube in which a suction is created, of a movable reservoir communicating therewith and adapted to contain a fluid such as mercury, a regulator for controlling the operation of the device by which suction is created in the tube, means acting on the regulator to operate it, and a connection between the movable reservoir containing fluid and the means for operating the regulator.

4. The combination of a regulator, devices acting normally on the regulator to operate it, a suction-tube, a movable counterbalancing-reservoir communicating with the tube and containing a liquid, such as mercury, and a connection between the movable counterbalancing-reservoir and the devices normally acting on the regulator.

5. The combination of a regulator, a tension device acting on the regulator, a suction-tube, a movable counterbalancing-reservoir communicating with the tube and containing a liquid, such as mercury, and a connection between the movable counterbalancing-reservoir and the tension device acting on the regulator.

6. The combination with a vacuum-gage, of a movable counterbalancing mercury-reservoir communicating therewith, a suction-regulator for controlling the suction in the gage, and connections between the suction-regulator and the mercury-reservoir.

7. The combination of a regulator, for controlling the operation of a suction creating or exhausting device, means acting on the regulator to operate it, a suction-tube, a movable counterbalancing-reservoir containing a fluid, such as mercury, and communicating with the suction-tube, and connections between the reservoir and the means acting on the regulator to operate it.

8. The combination of a regulator for controlling the operation of a suction creating or exhausting device, means acting on the regulator to operate it, a suction-tube E, a tube-section communicating with the bottom thereof, a movable reservoir H containing mercury or other liquid communicating with the tube-section, and a connection between the movable reservoir and the means acting on the regulator to operate it.

9. The combination with a regulator for controlling the operation of a vacuum creating or exhausting device, of a controlling-lever connected therewith, means acting on the controlling-lever to operate it, a suction-tube, a movable counterbalance-reservoir H containing liquid, such as mercury, communicating with the bottom of the suction-tube, and a connection between the controlling-lever and the movable counterbalancing-reservoir H.

In testimony of which invention I have hereunto set my hand.

MEREDITH LEITCH.

Witnesses:
ERNEST HOWARD HUNTER,
WM. L. EVANS.